United States Patent
Beekmann et al.

(10) Patent No.: US 10,487,801 B2
(45) Date of Patent: Nov. 26, 2019

(54) METHOD FOR OPERATING A WIND TURBINE

(71) Applicant: WOBBEN PROPERTIES GMBH, Aurich (DE)

(72) Inventors: Alfred Beekmann, Wiesmoor (DE); Marcel Kruse, Beverstedt (DE)

(73) Assignee: Wobben Properties GmbH, Aurich (DE)

( * ) Notice: Subject to any disclaimer, the term of this patent is extended or adjusted under 35 U.S.C. 154(b) by 168 days.

(21) Appl. No.: 15/553,883

(22) PCT Filed: Feb. 23, 2016

(86) PCT No.: PCT/EP2016/053728
§ 371 (c)(1),
(2) Date: Aug. 25, 2017

(87) PCT Pub. No.: WO2016/139082
PCT Pub. Date: Sep. 9, 2016

(65) Prior Publication Data
US 2018/0066629 A1    Mar. 8, 2018

(30) Foreign Application Priority Data
Mar. 2, 2015 (DE) .......... 10 2015 203 629

(51) Int. Cl.
*F03D 7/02* (2006.01)
*F03D 80/40* (2016.01)

(52) U.S. Cl.
CPC .......... *F03D 7/026* (2013.01); *F03D 7/0284* (2013.01); *F03D 80/40* (2016.05); *Y02E 10/721* (2013.01); *Y02E 10/723* (2013.01)

(58) Field of Classification Search
CPC ......... F03D 7/026; F03D 80/40; F03D 7/0284
See application file for complete search history.

(56) References Cited

U.S. PATENT DOCUMENTS 6,890,152 B1 * 5/2005 Thisted ............... F03D 80/40
416/1
8,183,707 B2    5/2012 Siebers et al.
(Continued)

FOREIGN PATENT DOCUMENTS

DE    102012204239 A1    9/2013
DE    102012205255 A1    10/2013
(Continued)

OTHER PUBLICATIONS

Eröffnung, "Offshore-Windpark Riffgat startet ohne Kabel", *Manager Magazin*, Aug. 11, 2013, URL=http://www.manager-magazin.de/unternehmen/energie/offshore-windpark-riffgat-von-ewe-eroeffnetohne-kabel-a-915924.html, retrieved on Aug. 25, 2017 (with machine English translation, 4 pages).
(Continued)

*Primary Examiner* — Viet P Nguyen
(74) *Attorney, Agent, or Firm* — Seed IP Law Group LLP (57) ABSTRACT

A method for operating a wind turbine comprising an aerodynamic rotor with an approximately horizontal axis of rotation, an electrical generator and operating devices is disclosed, wherein the wind turbine is intended for feeding electrical energy into an electrical supply grid, and is kept in a starting state for starting the generator while the wind turbine cannot be completely put into operation, in particular the generator cannot be started.

18 Claims, 3 Drawing Sheets

(56) References Cited

U.S. PATENT DOCUMENTS

| | | | |
|---|---|---|---|
| 2006/0002791 A1* | 1/2006 | Moroz | F03D 7/0204 416/1 |
| 2006/0034692 A1* | 2/2006 | Grabau | F03D 7/0224 416/132 B |
| 2006/0275121 A1* | 12/2006 | Merswolke | F03D 1/0608 416/132 B |
| 2007/0108769 A1 | 5/2007 | Wobben | |
| 2008/0084070 A1 | 4/2008 | Teichmann et al. | |
| 2010/0054941 A1* | 3/2010 | Hoffmann | F03D 7/0204 416/61 |
| 2010/0253079 A1* | 10/2010 | Bolln | F03D 7/026 290/44 |
| 2011/0042950 A1* | 2/2011 | Mizoue | F03D 7/0264 290/44 |
| 2011/0064573 A1* | 3/2011 | Viripullan | F03D 7/024 416/1 |
| 2012/0134807 A1* | 5/2012 | Axelsson | F03D 7/0204 416/1 |
| 2012/0139248 A1* | 6/2012 | Bertolotti | F03D 7/0204 290/44 |
| 2012/0207589 A1* | 8/2012 | Fridthjof | B64D 15/20 415/121.3 |
| 2012/0261917 A1 | 10/2012 | Egedal et al. | |
| 2013/0026757 A1* | 1/2013 | Peters | F03D 7/0224 290/44 |
| 2013/0028738 A1* | 1/2013 | Nordin | H05B 3/145 416/39 |
| 2013/0099497 A1* | 4/2013 | Bowyer | F03D 7/0204 290/44 |
| 2013/0106108 A1* | 5/2013 | De Boer | F03D 7/045 290/44 |
| 2013/0154262 A1* | 6/2013 | Tripathi | F03D 7/026 290/44 |
| 2013/0307961 A1* | 11/2013 | Puigcorbe Punzano | F03D 17/00 348/82 |
| 2014/0152013 A1* | 6/2014 | Spruce | F03D 7/0204 290/44 |
| 2014/0186176 A1* | 7/2014 | Andersen | F03D 7/0204 416/1 |
| 2014/0265329 A1* | 9/2014 | Jensen | F03D 7/0224 290/44 |
| 2015/0042094 A1 | 2/2015 | Beekmann | |
| 2015/0176568 A1* | 6/2015 | Laborda Rubio | F03D 7/044 416/1 |
| 2015/0240783 A1* | 8/2015 | Kii | F03D 7/0204 290/44 |
| 2015/0377215 A1* | 12/2015 | Agarwal | F03D 7/044 416/1 |

FOREIGN PATENT DOCUMENTS

| | | |
|---|---|---|
| EP | 1909371 A2 | 4/2008 |
| EP | 2056210 A2 | 5/2009 |
| EP | 2728175 A1 | 5/2014 |
| JP | 2012229692 A | 11/2012 |
| JP | 2013011200 A | 1/2013 |

OTHER PUBLICATIONS

"Die Schildbürger lassen grüßenDieselmotoren treiben Windräder an", *n-tv*, Aug. 9, 2013, URL=http://www.n-tv.de/wirtschaft/Es-fehlen-15-Kilometer-Kabel-Riffgat-Windpark-kuehlt-mit-Diesel-article11147661.html, retrieved on Aug. 25, 2017 (with machine English translation, 4 pages).

* cited by examiner

METHOD FOR OPERATING A WIND TURBINE

BACKGROUND

Technical Field

The present invention relates to a method for operating a wind turbine. The present invention also relates to a wind turbine and to a farm comprising multiple wind turbines.

Description of the Related Art

Wind turbines, particularly horizontal-axis wind turbines, are known. They take energy from the wind and convert it into electrical energy, which for simplicity can be referred to as generating electrical energy or generating electrical power.

As long as such wind turbines are in operation, they are consequently generating power, which is usually fed into an electrical supply grid. However, some of the power generated is used to supply operating devices. Apart from supplying the control system, that is to say a control computer or the like, there are also operating devices that sometimes require somewhat more power. These include an azimuth adjusting device, that is to say an adjusting device with which the wind turbine can be made to track the wind in its alignment. This usually comprises a number of azimuth motors for adjusting the nacelle of the wind turbine. Also included are devices for adjusting the rotor blades, with which therefore the rotor blades can be adjusted in their angle of attack, which is also referred to as pitching or adjusting the pitch angle. Furthermore, there may be devices for heating, in particular for heating the rotor blades, in order to prevent the formation of ice or to thaw ice that is present.

As soon as the wind turbine comes to standstill, particularly because the wind is too light, all of these devices are no longer required. The wind turbine in any case can no longer supply these devices with self-generated power and supplying them with electrical power from the grid into which the wind turbine otherwise feeds when it is in operation is very costly. The costs for taking power from the grid are often many times higher than the payment that a wind turbine operator receives for the same amount of power fed in.

Therefore, when the wind turbine is to be put into operation again, when, for example, the wind increases again, it is often necessary at first to buy in power expensively from the grid in order to correspondingly operate the necessary operating devices.

For wind farms, there have already been proposed solutions in which wind turbines are adjusted into different azimuth alignments when they run down as the wind correspondingly subsides, so that, when the wind increases again later, at least one of the wind turbines will to some extent be aligned favorably in relation to the wind. This is described by the document US 2007/0108769 A1. It is also proposed there only to use power from the grid for running up one wind turbine in the wind farm, in particular one that is as small as possible. When this wind turbine is then in operation, the power generated by it can be used to operate operating devices of other wind turbines of the farm, so that these can then run up.

A disadvantage of this is that the other wind turbines consequently first have to wait until the one wind turbine has run up. Consequently, power generation by the wind farm is delayed, whereby in turn power that could already be taken from the wind is sacrificed.

The German Patent and Trademark Office has searched the following prior art in the priority application relating to the present application: DE 10 2012 204 239 A1, US 2008/0084070 A1, the article "Offshore-Windpark Riffgat startet ohne Kabel" ["Riffgat offshore wind farm starts without cables"], manager magazin [manager Magazine], and the article "Die Schildbürger lassen grüßen. Dieselmotoren treiben Windräder an" ["Greetings from the citizens of Schilda. Diesel engines drive windmills"], n-tv.de.

BRIEF SUMMARY

Provided is a solution that is suitable for allowing as much power as possible to be taken from the wind and as little power or energy as possible from the wind to be sacrificed. At least it is intended to propose an alternative solution to the solutions that are known so far.

A method is proposed. This method is consequently intended for operating a wind turbine which comprises an aerodynamic rotor with an approximately horizontal axis of rotation, an electrical generator and also operating devices. The wind turbine is intended for feeding electrical energy into an electrical supply grid and it is kept ready in a starting state for starting the generator, while the generator however cannot be started.

The reason why the generator cannot be started may be, for example, that sufficient wind is not available. Another or additional possibility is that feeding into the electrical supply grid is not possible or permissible. Feeding into the electrical supply grid is not possible particularly whenever there is no connection, at least temporarily. Feeding in is also not possible when there is a fault in the grid, in particular the grid is down in the electrotechnical sense. In such cases, it also conceivable that, although feeding into the grid could be possible, depending on the severity of the fault in the grid it is not permissible to feed into the grid because of regulations, particularly of the grid operator. For example, it may be provided that a wind turbine must not feed into the grid if the grid frequency deviates for example by 2% from the nominal frequency.

It is also conceivable that local regulations temporarily prohibit starting of the generator, in particular to avoid a disruptive shadow that is being cast or the development of disruptive noise. In this case, it would not be prohibited by the grid operator—although this of course could also additionally be the case—but it would be prohibited for environmental reasons. Particularly the casting of a shadow may sometimes no longer be applicable, that is to say not a reason for prohibiting operation, even after a short time, when the sun has correspondingly moved further across the sky and/or clouds no longer cast a shadow or produce only diffuse light.

Prohibiting operation because of noise emission may depend on the time of day, or on the wind direction.

In any event, there are various reasons that prevent the generator from being started, but they may also be transient. Sometimes it is foreseeable exactly when these conditions will no longer apply.

In any event, it is proposed to keep the generator ready in a starting state even though it is not possible or permissible at that particular time for it to be started. This proposal is based in particular on the realization that it is often foreseeable that it will be possible for the generator to be started. A common occurrence would perhaps be the assessment of a weather forecast, or in general the assessment of weather measuring stations in the vicinity of the respective wind turbine, on the basis of which for instance it can be predicted when there will be wind of a sufficient strength to operate the turbine.

The proposal is also based on the realization that much energy may be lost while the wind turbine is preparing itself for starting the generator. It has been realized that this loss of energy can sometimes be so great that avoiding it even justifies permanently keeping the wind turbine ready to start immediately. Therefore, energy is expended to keep the wind turbine ready to start, such as, for example, energy for aligning the wind turbine into the wind or even energy for heating the wind turbine, in particular its rotor blades, in order to avoid the formation of ice or to remove ice.

The wind turbine preferably uses energy from at least one energy store in order to keep it ready in the starting state for starting the generator. Such an energy store may be filled during the operation of the wind turbine by the turbine, so that the taking of expensive electricity from the electrical supply grid is avoided. The wind turbine can therefore be started immediately, and generate energy immediately, as soon as boundary conditions allow. This constitutes additional energy in comparison with a mode of operation in which the wind turbine only readies itself for starting when the conditions for starting already exist.

Keeping the wind turbine ready in the starting state preferably comprises at least one of the following actions: heating the wind turbine, in particular rotor blades of the rotor to avoid the formation of ice or for thawing ice and aligning the wind turbine into the wind.

Aligning the wind turbine into the wind, that is to say adjusting the azimuth position into the wind, does not necessarily have to require very much energy, particularly whenever there are stable weather conditions in which the wind direction is not continually changing. A tolerance angle by which the current alignment may deviate from the optimum alignment of the azimuth position until the azimuth position is adjusted, may preferably be chosen to be greater than in normal operation. Here, this angle may preferably be less than 10 degrees, preferably less than 20 degrees. The wind turbine could then start immediately when there is sufficient wind or other impediments no longer apply, possibly with a not quite optimum azimuth position. It can then however be adjusted very quickly, and possibly also even already with energy that the wind turbine can already generate itself.

The heating of the wind turbine, in particular of rotor blades, for preventing the formation of ice or for thawing ice, can sometimes use a very large amount of energy. On the one hand, heating in principle requires a comparatively large amount of energy and, on the other hand, modern wind turbines have very large rotor blades, and consequently very large surface areas on which the formation of ice can occur, which leads to heating over a correspondingly large area.

On the other hand, it has however been realized that the period of time before which the wind turbine can actually be operated and generates power again after the impediment is no longer applicable may be very long if an existing formation of ice first has to be removed. In this case, there is consequently a very long period of time that passes before the wind turbine is actually operated normally again. In this long period of time, it will also correspondingly not be possible for a very large amount of energy to be generated from the wind, so that also in this case a very large amount of energy would be sacrificed. This great amount of energy is therefore to be set against the expenditure required for early heating of the rotor blades.

In other words, although a large amount of energy is required for heating the rotor blades, as a result even more energy can be obtained.

According to one embodiment, the proposed method is characterized in that the wind turbine is adjusted in its azimuth angle for aligning into the wind as soon as its azimuth alignment deviates from an optimum alignment into the wind by more than a tolerance angle, and/or deviates for longer than a predetermined waiting time, wherein the size of the tolerance angle and/or the size of the waiting time depends on whether the generator is in operation, and/or how great the wind speed is, in particular the size of the tolerance angle and/or the size of the waiting time being all the greater the lower is the wind speed.

Therefore, the wind turbine is not aligned into the wind in its azimuth angle immediately and right away, but only if the deviation is great or, in addition, any waiting time has elapsed. Such a tolerance angle and the waiting time depend, inter alia, on whether the generator is in operation. If it is in operation, a tolerance angle that is as small as possible is taken as a basis and as little waiting time as possible, best of all no waiting time, is taken as a basis. In this case, the wind turbine is essentially in normal operation and is then also made to track the wind as accurately as possible.

If, however, the generator is not in operation, it may be sufficient to take a greater tolerance angle as a basis and also, or in addition, it may be sufficient to wait a long time before the tracking is carried out. When there are particularly low wind speeds, a longer time may be waited until the position is adjusted. The same applies to the tolerance angle, which can be set to a greater value. Particularly when the wind speed is so low that the wind turbine cannot be put into operation at all at the time, the wind speed is therefore at most just about great enough to allow its direction to be determined, a very restrained tracking may be sufficient.

When there are higher wind speeds, the tracking should be less restrained, especially since there is already sufficient wind to operate the turbine. If in this case an impediment preventing operation is therefore no longer applicable, if that is, for example, a cloud no longer casts a shadow, the turbine may be operated immediately and with good azimuth adjustment.

When there is no wind or the wind direction is hard to measure, an alignment of the wind turbine into the wind, that is to say an adjustment of the azimuth position, is preferably performed on the basis of a wind direction transmitted from a measuring mast or a weather station.

When there are very low wind speeds or there is even no wind at the wind turbine, a measurement of the wind direction is scarcely possible or not possible at all. Nevertheless, it is proposed however to prepare the wind turbine for immediate operation, that is in particular if the wind is suddenly sufficiently strong. It may consequently also be advisable even when there is no wind to align a wind turbine into the wind. Of course, by definition, an alignment into the wind is not possible when there is no wind, but an alignment into a wind measured in the vicinity is possible and sometimes the wind, at least at a measuring mast that measures accurately, may still be sufficient to establish a wind direction, the wind, however, being so light that it is perceived as no wind, or at least cannot be measured or is not present at the wind turbine concerned. If only the wind increases, say with the wind direction thus determined, the wind turbine is nevertheless already aligned in the correct direction, or at least approximately in the correct direction.

The method is preferably characterized in that a first tolerance angle and/or a first waiting time are chosen when the generator is in operation, and a second tolerance angle and/or a second waiting time are chosen when the generator is not in operation, and optionally a third tolerance angle and/or a third waiting time are chosen when the generator is not in operation and the direction of the wind direction is obtained from a measuring mast or a weather station. In particular, it is proposed here that the third tolerance angle is greater than the second tolerance angle and the second tolerance angle is greater than the first tolerance angle. Likewise, it is proposed with particular preference that the third waiting time is greater than the second waiting time and the second waiting time is greater than the first waiting time. Tracking of the azimuth position is therefore performed in all the more restrained a manner the more the given situation depends on a possible operating situation. In the first case, that is to say with the first tolerance angle and/or the first waiting time, the wind turbine is in operation.

According to a preferred embodiment, it is proposed that a heating device, in particular of the rotor blades, is started when, on the basis of a weather forecast, sufficient wind for operating the wind turbine, including the generator, is to be expected within a preparation time period, in particular wind that is strong and persistent enough that the energy required for heating the rotor blades can be generated again. Here a heating device, in particular a heating device of the rotor blades, is started particularly in anticipation that the wind turbine can soon be put into operation. In other words, here energy is initially invested in heating the turbine, in particular the rotor blades, on the assumption that the turbine can soon be operated and will also soon have generated again the energy expended for this.

It is therefore expressly proposed here to operate the heating device before the wind turbine can actually be put into operation. The heating is performed as a precautionary measure, and consequently also cannot use energy that is generated directly by the wind turbine. Instead, this energy must be taken from other sources. It is conceivable to use for this a battery store or other store of electrical energy. It is possibly also conceivable to use for this energy from another wind turbine, if it is already receiving sufficient wind for it to operate. Often, however, when there is not sufficient wind from any wind turbine in a wind farm, that is to say from any wind turbine in the vicinity of the wind turbine being considered, energy is generated.

A further possibility is to take this energy from the electrical supply grid and pay for it, possibly expensively. When a great amount of wind can be expected, this precautionary heating may nevertheless be advantageous in the end, because it allows the wind turbine to be immediately ready to start when this expected stronger wind then occurs, and consequently energy can be generated immediately without sacrificing energy due to a starting process that takes too long.

An important aspect is therefore that of making and/or keeping the wind turbine, in particular the generator, ready to start at a time at which it cannot however start at all. This may be performed specifically in expectation of an imminent start, and/or permanently.

Making the generator ready to start amounts to also keeping the wind turbine as a whole ready to start. In the end, making the generator ready to start also represents making the wind turbine ready to start. For example, aligning the nacelle of the wind turbine is also possible permanently, in particular if it is performed in a somewhat more restrained manner than in normal operation. In the case of particularly energy-intensive preparation measures, such as the heating of the rotor blades, it is conceivable to perform it only when starting of the generator can be expected before the blade has to be heated another time or many other times. With respect to the heating of the rotor blades for preventing the formation of ice or for thawing an existing formation of ice or a layer of ice, it should be noted that this phenomenon does not by any means occur throughout the winter. Rather, particular weather conditions are necessary for it. These include specifically that the formation of ice occurs particularly at temperatures around and just below the freezing point. Furthermore, such a formation of ice requires humid air, and wind is also usually required in order for such a formation of ice to be expected.

Correspondingly, although the permanent heating of rotor blades involves a high expenditure of energy, and is therefore undesired, a control system for preventing the formation of ice could also be operated permanently, even when the turbine is not being operated. This applies in particular whenever the control system for preventing the formation of ice takes into account whether the formation of ice is to be expected in the first place. Taking into account that wind is often also required in order for a formation of ice to occur, it is also often to be expected that suitable ambient conditions for operating the wind turbine, that is to say for switching on the generator, are not that far away when a formation of ice is anticipated.

Consequently, a method in which a control system for preventing and/or removing a formation of ice is operated even when the generator is not in operation is also preferably proposed.

According to an advantageous refinement, it is proposed that the method is characterized in that a starting time at which it can be expected that the wind turbine, in particular the generator, can be started is calculated or predicted, and a predetermined lead time before the starting time the wind turbine is brought into a starting state for starting the generator and is kept ready in that state until the starting of the generator. Therefore, initially a starting time is calculated or predicted. This may take place, for example, on the basis of a weather forecast if the starting point is that time at which there is sufficient wind again. It may, however, also be a time of day if the fact that it is not in operation is due to a noise emission prohibition and this noise emission prohibition is no longer applicable at a specific time. This may also be a time at which, on account of the known position of the sun, a shadow is no longer being cast or is no longer being cast at a problematic location. This starting time that is calculated or predicted there may also deviate later from the starting time that is actually possible. Possibly, contrary to such a calculation, the starting of the wind turbine is also completely abandoned initially, or at least for a considerable time.

In any event, such a starting time is calculated; specifically in the case where a weather forecast is taken as a basis, it could also be referred to as predicting such a starting time.

It is then proposed to make the wind turbine ready to start in advance for this predicted or calculated starting time. For this purpose, a lead time, which may always be the same turbine-specifically and can consequently form a constant, is predetermined. In a preferred embodiment, the lead time may however also depend on boundary conditions, for example may be chosen to be greater in winter than in summer, in order also to take into account the deicing process.

It is therefore then proposed with this lead time to make the wind turbine ready to start earlier than the starting time. This may, for example, mean beginning deicing, aligning the wind turbine in its azimuth position in relation to the wind and/or adjusting the rotor blades correspondingly in their angle of attack in relation to the wind. After that, the wind turbine is then ready to start and is kept in this state until it can actually be started. This would optimally take place at the calculated starting time, but it may also, for example, take place later. The lead time is preferably chosen to be greater, in particular at least twice as great, as would be necessary for preparing the wind turbine for starting. This also allows for the realization that it is much more important to ensure that the wind turbine is indeed ready to start when the boundary conditions allow starting than presuming to save energy that would be necessary to keep the wind turbine in the state of being ready to start.

Also proposed is a wind turbine that is prepared to carry out at least a method according to one of the embodiments described above. In particular, it is proposed that such a wind turbine is distinguished by the fact that the wind turbine, or an electrical system network connected to it, has at least one energy store for storing energy and for delivering electrical energy, the energy store being dimensioned such that it can store sufficient energy for heating the rotor blades of the wind turbine, in particular can store enough energy to allow rotor blades that are completely iced up to be thawed, and/or can store enough energy to allow the rotor blades to be heated with maximum heating power for a predetermined heating time period, the heating time period preferably being at least one hour, in particular at least 3 hours.

It is consequently proposed to provide the wind turbine with an energy store, which may also have a connected electrical system network of the wind turbine in order to provide in it sufficient energy for heating the rotor blades. With this energy it is consequently intended to prevent the formation of ice by heating the rotor blades or it is intended to heat the rotor blades such that existing ice can be thawed. It is correspondingly proposed to dimension this energy store correspondingly. However, this energy store is preferably sufficiently large also to operate other operating devices of the wind turbine while the wind turbine itself is not in operation. This particularly includes also operating an azimuth adjustment and/or operating pitch adjustments for the rotor blades, in order to align them in their angle of attack in relation to the wind. However, the fraction of energy for heating the rotor blades is likely to be much greater than the energy for other applications. It is correspondingly proposed here to dimension the size of the energy store on the basis of the energy required for the heating of rotor blades.

Dimensioning is preferably performed in such a way that sufficient energy for heating the rotor blades with maximum heating power for a predetermined heating time period can be stored. This heating time period is preferably set to at least one hour, in particular at least three hours. The maximum heating power for the existing heating devices for the rotor blades is a prescribed known value of each wind turbine and the energy store can consequently be clearly dimensioned on the basis of the prescribed time period.

Also proposed is a wind farm that has at least two wind turbines as they have been described above according to the embodiment.

This wind farm preferably has one or more energy stores. This one energy store or the sum of all the existing energy stores of the wind farm is dimensioned such that all the rotor blades of all the wind turbines in the farm can be heated for a correspondingly predetermined heating time period and/or that with the sum of the energy of all the energy stores of the farm is sufficient to thaw all the rotor blades of all the wind turbines in the farm.

BRIEF DESCRIPTION OF THE SEVERAL VIEWS OF THE DRAWINGS

The invention is explained more precisely below by way of example on the basis of embodiments with reference to the accompanying figures.

DETAILED DESCRIPTION

Figure 1:
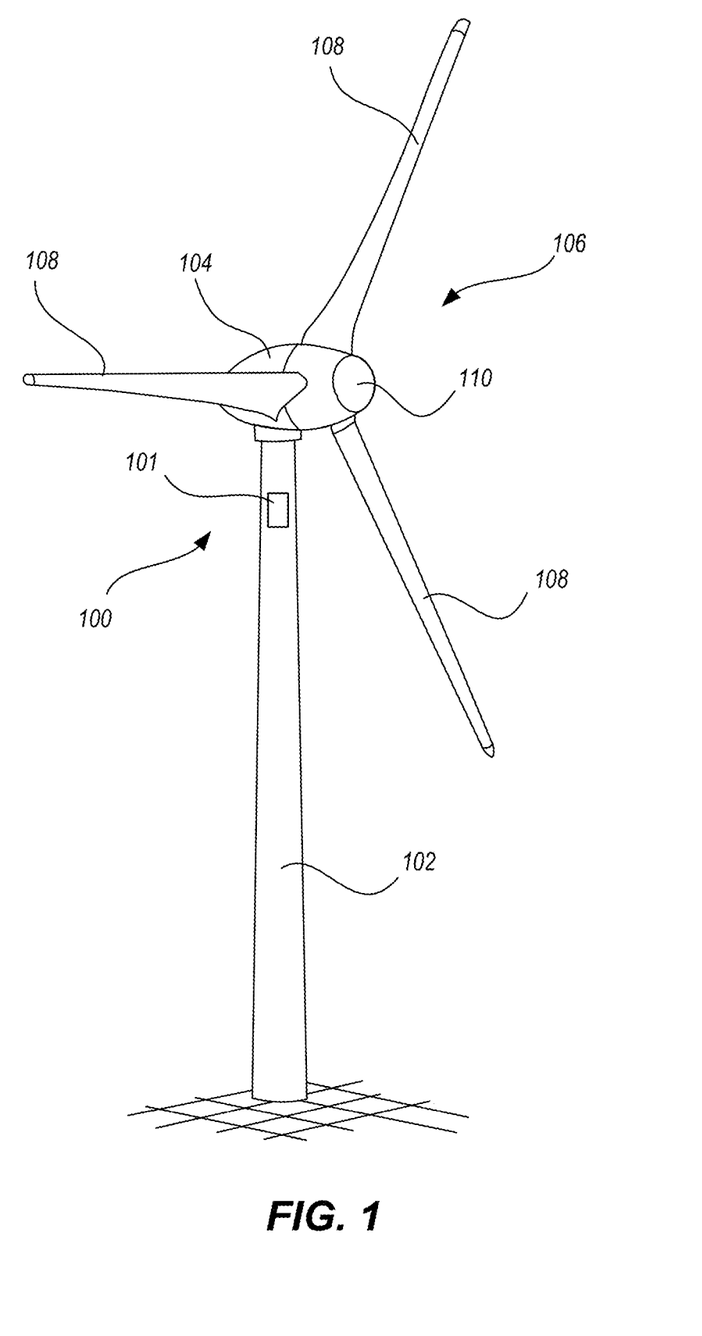
FIG. 1 schematically shows a wind turbine.

FIG. 1 shows a wind turbine 100 comprising a tower 102 and a nacelle 104. Arranged on the nacelle 104 is a rotor 106 with three rotor blades 108 and a spinner 110. During operation, the rotor 106 is set in a rotating motion by the wind and thereby drives a generator in the nacelle 104.

Figure 2:
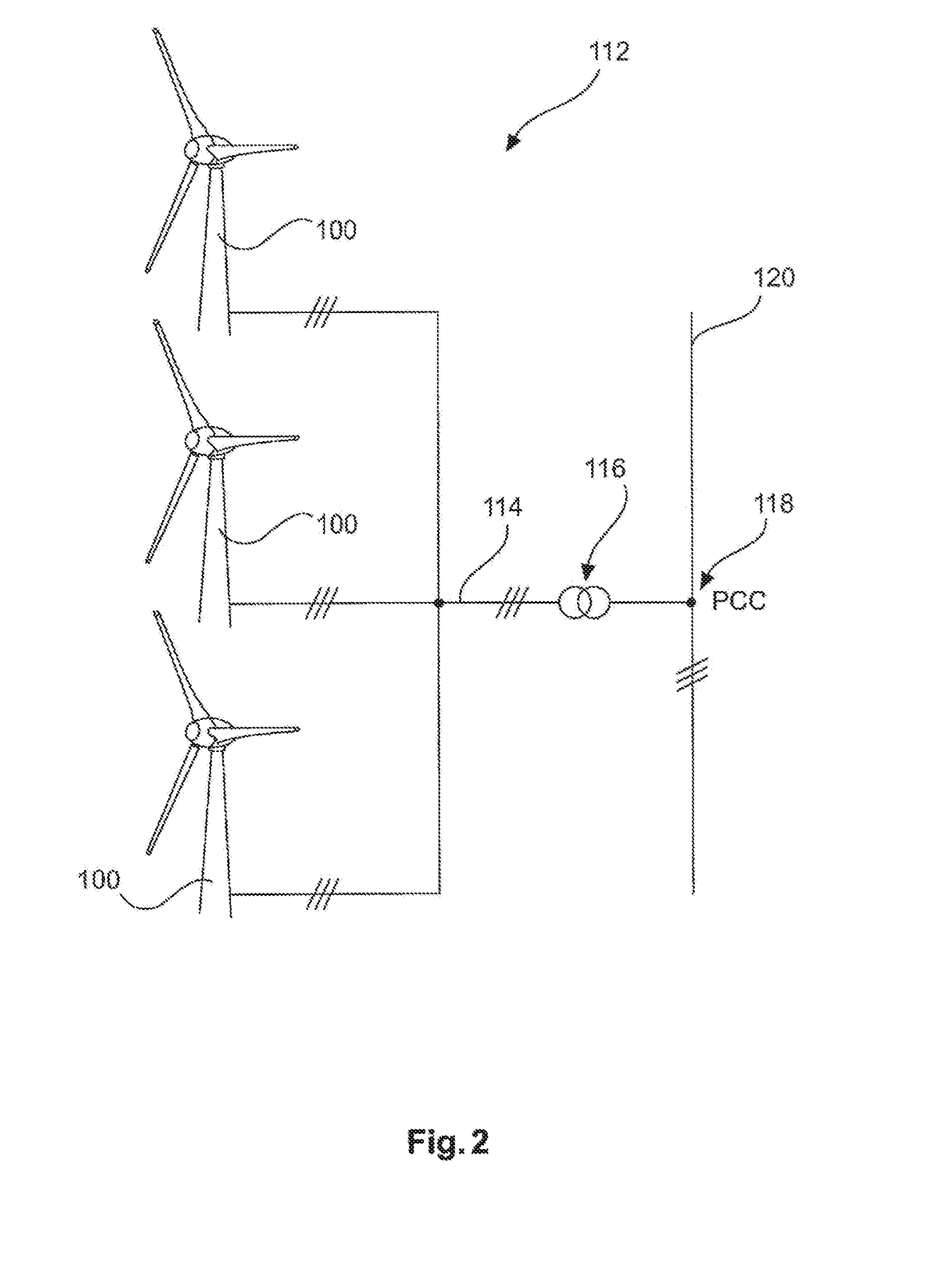
FIG. 2 schematically shows a wind farm.

FIG. 2 shows a wind farm 112 comprising by way of example three wind turbines 100, which may be identical or different. The three wind turbines 100 are consequently representative of in principle any number of wind turbines of a wind farm 112. The wind turbines 100 provide their power, that is in particular the electricity generated, by way of an electrical farm system 114. In this case, the respectively generated electricity or power of the individual wind turbines 100 is added together and there is usually a transformer 116, which steps up the voltage in the farm to then feed it into the supply grid 120 at the feeding-in point 118, which is also generally referred to as the PCC. FIG. 2 is only a simplified representation of a wind farm 112, which, for example, does not show any control system, although of course there is a control system. Also, for example, the farm system 114 may be differently designed, in that, for example, there is also a transformer at the output of each wind turbine 100, just to mention one other exemplary embodiment.

Figure 3:
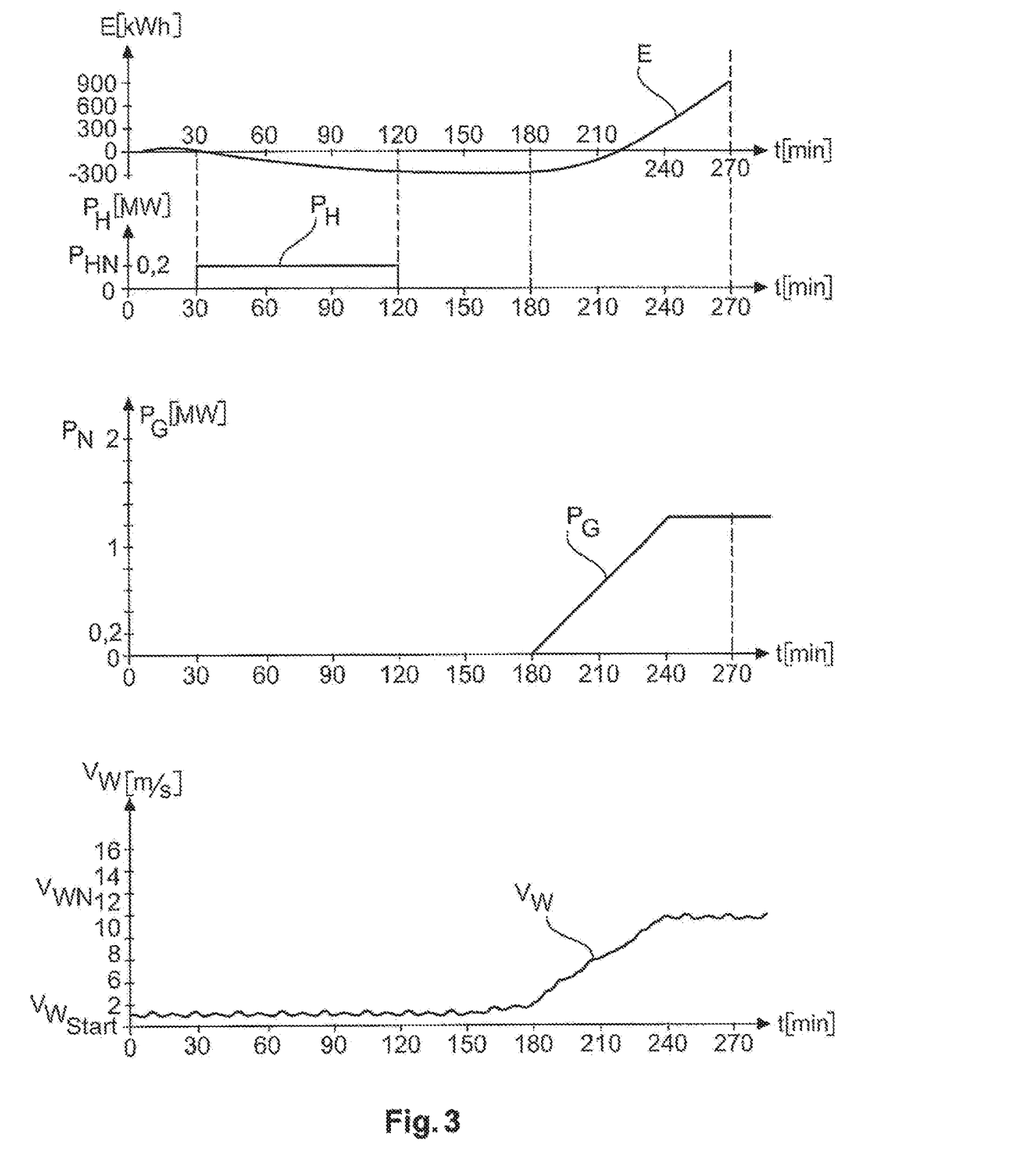
FIG. 3 shows four time diagrams for illustrating a heating process by way of example according to an embodiment of the invention.

FIG. 3 schematically shows in the lowermost diagram a possible profile of a wind speed. Accordingly, for the first 180 minutes, that is to say three hours, the wind speed $V_W$ lies below a depicted starting wind speed, which for simplicity is entered here as two meters per second. Exact values of the wind speed are immaterial herein. The diagrams of FIG. 3 nevertheless attempt to show a curve that is also realistic in terms of the numerical values. However, the representations are schematic and the interrelationships that are shown and explained should be also understood as schematic interrelationships, and there may particularly also be drawing inaccuracies.

At 180 minutes, the wind speed $V_W$ then increases such that it exceeds the starting wind speed $V_{WStart}$. At approximately 240 minutes, that is to say one hour later, the wind speed has then settled at a value of approximately 10 meters per second. In the case of this representation, a nominal wind speed is set at 12 meters per second, and therefore even after 240 minutes the wind speed still remains below the nominal wind speed. The representation therefore shows an entirely realistic case, in which the wind speed increases from very light, that is so light that the wind turbine cannot be operated at all, to a higher value, which however still lies below the nominal wind speed $V_{WN}$.

The diagram additionally shows the power $P_G$ generated by the generator of the wind turbine. Here, the index G has been chosen to make clear the difference from the heating power $P_H$ in the diagram above it.

The generator may therefore not generate any power for the first three hours, because the wind is too light. After three hours, the wind speed is then strong enough that the generator can be started, which was not possible before. The generator is therefore then started and generates a power corresponding to the wind speed $V_W$. This diagram shows by way of example the generated power in MW and here a wind turbine with a nominal power $P_N$ of 2 MW is assumed, which nowadays is equivalent to a wind turbine of a medium or even relatively small size. Because the wind speed $V_W$ does not reach its nominal wind speed $V_{WN}$, the power $P_G$ generated by the generator also does not reach its nominal power value $P_N$ of 2 MW.

It can also already be seen from these two lower diagrams that, at that particular time where the wind speed $V_W$ exceeds the starting wind speed $V_{WStart}$ of two meters per second, the generator is also immediately started and can generate power $P_G$.

This power $P_G$ is at first low, because the wind speed is also still very low. The linear increase in the power $P_G$ is in this case idealized. The profile could also look somewhat different, but would probably take a similar course if the wind speed $V_W$ were to behave as described.

The third diagram from the bottom shows an exemplary profile of a heating power $P_H$, which is likewise indicated in MW, the same dimensioning having been chosen as for the representation of the generator power $P_G$. This diagram of the heating power $P_H$ shows an increase in the heating power $P_H$ at 30 minutes from zero to 0.2 MW, that is to say 200 kW. For the exemplary example, these 200 kW are the nominal value for the heating power $P_{HN}$. This diagram is based on the idea that the wind turbine has determined after the depicted 30 minutes that the rotor blades are to be deiced, because the formation of ice has been detected. The control system therefore then carries out a deicing operation, in which the rotor blades are heated, which in the example assumed requires 200 kW of heating power.

This heating of the rotor blades is consequently carried out even though the wind turbine is not in operation at all and, on account of the low wind speed, also cannot be put into operation at all. The generator therefore cannot be put into operation, and also cannot provide the heating power.

The representation then assumes that this heating power is required for one and a half hours, that is to say from 30 to 120 minutes. At 120 minutes, the deicing is then successfully completed and the heating of the rotor blades is switched off, so that the heating power $P_H$ again assumes the value zero. The wind speed is thus still at a value at which the generator cannot be started.

The uppermost diagram is intended to represent the energy balance of the wind turbine, but for simplicity takes into account here only the power $P_G$ generated by the generator and the heating power $P_H$ consumed by the heating device. It is assumed that at 30 minutes as the starting value the energy balance is zero. The energy consumption is identified by E.

At 30 minutes, the heating operation therefore begins and continues for one and a half hours. Correspondingly, 300 kWh are consumed. At 120 minutes, therefore, the energy balance is negative with these −300 kW. This value persists for a further hour, that is until 180 minutes, because in this time no heating power $P_H$ is consumed nor generator power $P_G$ generated.

At 180 minutes, the generator can then be started because the wind speed has just exceeded the starting wind speed $V_{WStart}$. The rotor blades have been deiced and what is more the wind turbine is also otherwise ready to start, and the power can consequently be generated immediately in a way corresponding to the prevailing wind speed. This has already been described further above.

As from 180 minutes, therefore, the energy E or energy balance then increases. After somewhat more than 40 minutes, the generator has then generated as much energy as has been consumed by the heating of the rotor blades. At the same time, the power continues to increase and the energy, as an integral of the power over time, correspondingly increases even more strongly. At 270 minutes, that is to say one and a half hours after the start of the generator, the energy is then approximately at 900 kWh.

It should be noted that then, one and a half hours after the wind speed was sufficiently high to operate the wind turbine, the energy balance is a distinctly positive energy balance. One and a half hours is also the time that the rotor blades have been heated, that is from 30 to 120 minutes, so that in this representation one and a half hours was therefore required to deice the blades, and consequently make the wind turbine ready to start. If the heating, and consequently deicing, of the rotor blades had not already taken place, the wind turbine would have had to begin initially at 180 minutes. Since the shown heating operation has already heated with nominal power, that is to say nominal power $P_{HN}$ of the heating device, deicing, which starts at 180 minutes, would also not have been any quicker. In other words, the wind turbine would then have been ready to start at the earliest at 270 minutes. It would therefore have been able to generate power at the earliest at 270 minutes, and then at the earliest would have been able to contribute to a positive energy balance.

In fact however it would also have initially required heating power, and consequently would have initially also consumed energy itself. For the sake of overall clarity, this variant is not depicted, but it should be immediately evident that, if the heating is only started at 180 minutes, by 270 minutes the energy would have dropped to −300 kWh. Therefore, in this example the proposed solution leads to an energy advantage of 1.2 MWh.

This schematically illustrated process of FIG. 3 is particularly efficient whenever the energy required for heating can be taken from an energy store 101 (FIG. 1) that the wind turbine has initially charged itself with electrical energy. This is so because in this case expensive energy from the grid would not have to be bought in for the heating operation. What is more, it would also not necessarily be helpful when there are low wind speeds, with which therefore little wind power is fed into the grid in any case, also to take energy from the grid for heating. This would of course nevertheless be an option in the event that no energy store is available or the energy store is not filled.

The invention claimed is:

1. A method for operating a wind turbine comprising an aerodynamic rotor with an approximately horizontal axis of rotation, an electrical generator and power-consuming devices, the method comprising:
configuring the wind turbine for feeding electrical energy into an electrical supply grid; and
keeping the wind turbine in a starting state for starting the generator while the wind turbine cannot be put into operation, wherein keeping the wind turbine in the starting state includes aligning the wind turbine into the wind by:
setting at least one of a tolerance angle to a first tolerance angle, and a waiting time to a first waiting time when the generator is in operation, and setting at least one of: the tolerance angle to a second tolerance angle, and the waiting time to a second waiting time when the generator is not in operation; and adjusting an azimuth angle of the wind turbine when an azimuth alignment at least one of: deviates from an optimum alignment into the wind by more than the tolerance angle, and deviates from the optimum alignment into the wind for longer than the waiting time.

2. The method according to claim 1, wherein the wind turbine cannot be put into operation when the wind turbine cannot be started because of at least one of:

sufficient wind is not available;

feeding into the electrical supply grid is not possible or permissible; and local regulations temporarily prohibit starting of the generator to avoid a disruptive shadow that is being cast or development of disruptive noise.

3. The method according to claim 1, wherein:

keeping the wind turbine in the starting state for starting the generator comprises using energy from at least one energy storage.

4. The method according to claim 1, wherein keeping the wind turbine in the starting state includes:

heating rotor blades of the aerodynamic rotor of the wind turbine to avoid a formation of ice or to thaw ice.

5. The method according to claim 4, wherein the tolerance angle and the waiting time depend on at least one of:

whether the generator is in operation, and a wind speed.

6. The method according to claim 1, comprising:

when there is no wind or when a measurement of wind direction is not available at the wind turbine, adjusting an azimuth position based on a wind direction measurement transmitted from a measuring mast or a weather station.

7. The method according to claim 1, comprising:

starting a heating device of rotor blades when, based on a weather forecast, sufficient wind for operating the wind turbine, including the generator, is expected within a preparation time period, wherein the sufficient wind is strong and persistent enough that energy required for heating the rotor blades can be generated.

8. The method according to claim 1, comprising:

operating a control system for at least one of preventing a formation of ice and removing ice that has formed when the generator is not being operated.

9. The method according to claim 1, comprising:

calculating or predicting a starting time when the generator is expected to be started;

bringing the wind turbine into the starting state for starting the generator a predetermined lead time before the starting time; and keeping the wind turbine ready in the starting state until the generator is started.

10. A wind turbine configured to perform the method according to claim 1.

11. The wind turbine according to claim 10, wherein at least one of the wind turbine or an electrical system network connected to the at least one of the wind turbine has at least one energy storage for storing energy and for delivering electrical energy, wherein the at least one energy storage is dimensioned such that it is able to store sufficient energy for heating rotor blades of the wind turbine.

12. The wind turbine according to claim 11, wherein the at least one energy storage is able to store enough energy to at least one of:

allow rotor blades that are completely iced to be thawed, and allow the rotor blades to be heated with a maximum heating power for a predetermined heating time period.

13. The wind turbine according to claim 12, wherein the heating time period is at least one hour.

14. The wind turbine according to claim 13, wherein the heating time period is at least three hours.

15. A wind farm comprising at least two wind turbines according to claim 10.

16. The wind farm according to claim 15, comprising at least one energy storage dimensioned such that in the wind farm altogether sufficient energy for heating rotor blades of the wind turbines can be stored, wherein the sufficient energy allows the rotor blades of all the wind turbines of the wind farm that are completely iced to be thawed, allows the rotor blades of all the wind turbines of the wind farm to be heated with a maximum heating power for a predetermined time period that is at least one hour.

17. The method according to claim 1, wherein at least one of the tolerance angle and the waiting time are inversely proportional to the wind speed.

18. The method according to claim 1, further comprising:

selecting at least one of a third tolerance angle and a third waiting time when the generator is not in operation when a wind direction measurement is obtained from a measuring mast or a weather station.

* * * * *